US006252871B1

(12) United States Patent
Posner et al.

(10) Patent No.: US 6,252,871 B1
(45) Date of Patent: *Jun. 26, 2001

(54) SWITCHABLE COMBINER/SPLITTER

(75) Inventors: Richard D. Posner, Woodland Hills; Thuan Tran, Fountain Valley, both of CA (US)

(73) Assignee: Powerwave Technologies, Inc., Irving, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,734

(22) Filed: Jul. 1, 1998

(51) Int. Cl.[7] ............................. H04L 12/50; H04Q 11/00
(52) U.S. Cl. .................................... 370/360; 333/17.3
(58) Field of Search ...................... 370/360, 357, 370/359, 367, 373, 396, 419, 420, 423; 333/101, 105, 106, 108, 112, 118, 122, 124, 17.3, 208, 258, 262, 263, 135, 157, 32, 35; 330/51; 324/415, 418, 416

(56) References Cited

U.S. PATENT DOCUMENTS

| 4,315,222 |   | 2/1982 | Saleh ..................................... 330/124 |
|-----------|---|--------|-----------------------------------------------------|
| 4,472,691 |   | 9/1984 | Kumar et al. ........................ 333/103 |
| 5,179,332 | * | 1/1993 | Kang .................................... 324/313 |
| 5,304,943 | * | 4/1994 | Koontz ................................... 330/51 |
| 5,661,434 | * | 8/1997 | Brozovich et al. .................... 330/51 |
| 5,754,082 | * | 5/1998 | Swanson ............................. 333/100 |
| 5,867,060 | * | 2/1999 | Burkett, Jr. et al. .................... 330/2 |
| 5,872,491 | * | 2/1999 | Kim et al. ............................ 333/101 |

* cited by examiner

*Primary Examiner*—Dang Ton
*Assistant Examiner*—Phirin Sam
(74) *Attorney, Agent, or Firm*—Hale and Dorr LLC

(57) ABSTRACT

An apparatus for either combining a plurality of high frequency RF signal inputs or splitting a single RF frequency input into a plurality of RF signal outputs employs a switchable combining/splitting section and a switchable matching section. The switchable combining/splitting section operates to either combine the RF signal inputs to a common summed output or to take a matched input and to split it into a plurality of outputs. The matching section operates to switchably match the impedance presented by the combining/splitting section to achieve a minimum or zero insertion loss through the apparatus.

20 Claims, 4 Drawing Sheets

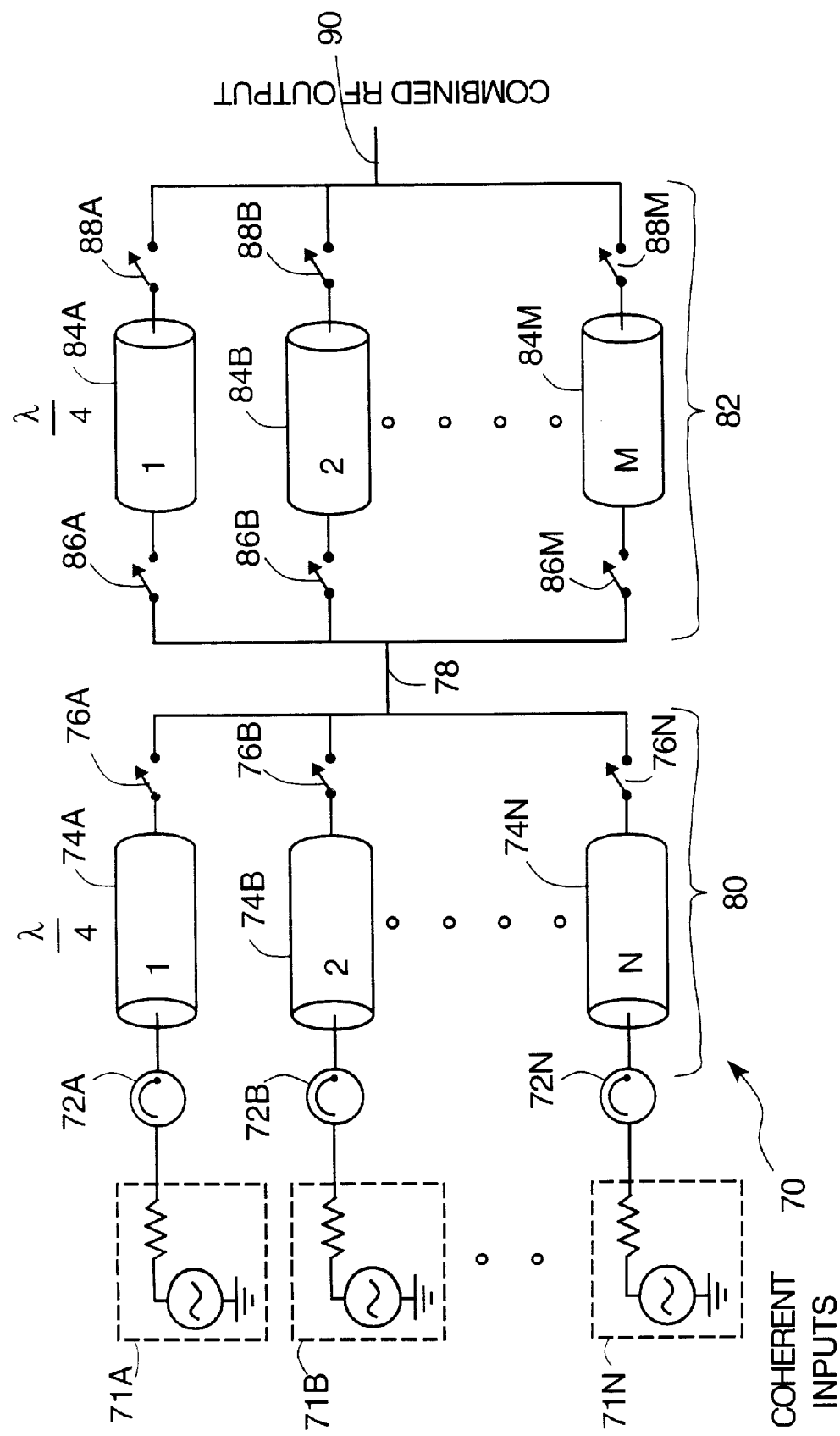

SWITCHABLE COMBINER/SPLITTER

BACKGROUND OF THE INVENTION

The invention relates generally to high power, high frequency RF signal manipulation, and in particular to a combiner/splitter for handling high power RF signals.

Switched power combiners for operation at RF frequencies are well known in the art. These units provide the capability of combining the output of several preferably coherent, in phase, signal sources to achieve a higher combined output power. For purposes of this description, it is assumed that all of the signals sources are in phase.

The goal of any design of an N-way power combiner (where N is any positive integer) is to be able to combine the signals on the various input lines, having coherent sources, with little or no penalty due to insertion loss or input VSWR, regardless of how many of the inputs are selected at any given time.

In order to achieve this result, many known configurations have been developed for providing switching along with low insertion loss. Thus, for example, a simple circuit such as that illustrated in FIG. 1 provides a plurality of switched half-wave coaxial transmission lines having a common summing point and connected from that point, through a half-wavelength line to an output. The half-wave-length lines are often implemented as two quarter wave length transmission lines connected in series. Such switchable configurations, however, are typically tuned for a known number of closed switches. As different numbers of switches are closed, the impedance seen at the summing point varies and substantial insertion losses, due to mismatches, can be incurred.

Various techniques have been used to ameliorate this problem so that, for example, different numbers of closed switches will all incur some, but not a lot, of insertion loss.

In one practical application, for example where a cellular base station is provided, it is desirable to use only one signal input source initially and to add additional sources as the volume of calls and users increases. In this situation, the addition of new sources can also require a complete retuning of the combiner, or even its replacement. This is an inconvenience not easily tolerated. Further if a source should fail, its removal could cause a significant power loss, due to mismatching, far beyond the loss of the source itself.

As a result, therefore, it would be desirable to enable hot switching of RF sources without adversely affecting the impedance match of other sources. It is also desirable to provide the ability to vary the number of sources without having to remove or replace the combiner.

SUMMARY OF THE INVENTION

The invention relates to an apparatus and method for combining or splitting a plurality of high frequency RF signal inputs. The combining apparatus features a first combining section for switchably combining selected ones of the RF signal inputs and providing a common signal output. The apparatus further features a switchable matching section connected at its input to the common signal output and switchably inserting matching lines between its input and its own output. The switchable matching section is able, by a selected switch pattern, to substantially match the impedance presented to it by the common signal output. Thus, as the RF inputs to the first combining section can be switchably changed, so the matching section can be switchably changed in accordance therewith to minimize and substantially eliminate insertion loss through the combiner apparatus.

The method for combining a plurality of high frequency RF signal inputs features the steps of switchably combining selected ones of the RF signal inputs and providing a common summed signal output, switchably inserting matching lines between the common summed signal output and a combined output for matching the impedance presented by the switchably combined signal inputs, and switchably inserting the matching lines in correspondence to switchably combining the RF signal inputs to provide a minimized insertion loss from the RF signal inputs to a combined output.

The apparatus for splitting a high frequency RF signal input into a plurality of RF signal outputs features a splitting section for switchably splitting an RF signal input from the output of a matching section, a switchable matching section connected at its input to the high frequency RF signal input and able to switchably insert matching lines between its input and its output, the switchable matching section being able, by a selected switch pattern, to substantially match the impedance presented to it by the splitting section, whereby the number of RF outputs from the splitting section can be switchably changed, and the matching section can be switchably changed to minimize insertion loss through the splitting apparatus.

The method for splitting a high frequency RF signal input features the steps of splitting selected ones of the RF signal inputs from the common summed signal output, switchably inserting matching lines between a common summed signal output and the RF signal input for matching the impedance presented by a splitting section, and switchably inserting the matching lines in correspondence to switchable splitting of the RF signal input to provide a minimized insertion loss from the RF signal input to split the outputs.

Advantages of the invention include a minimization or elimination of insertion loss by enabling a matching section to be switchably configured to the combining/splitting section.

Other advantages of the invention are the convenience of enabling hot swamping without adversely affecting the combining/splitting of other RF input signals, and the ability to "grow" a system without the need for revising or replacing the combiner/splitter apparatus.

DESCRIPTION OF THE DRAWINGS

Other features and advantages of the invention will be apparent from the following description, taken together with the drawings, in which:

FIG. 4 is an illustration of yet another alternate embodiment of a combiner/splitter in accordance with the invention.

DESCRIPTION OF PARTICULAR PREFERRED EMBODIMENTS

Figure 1:
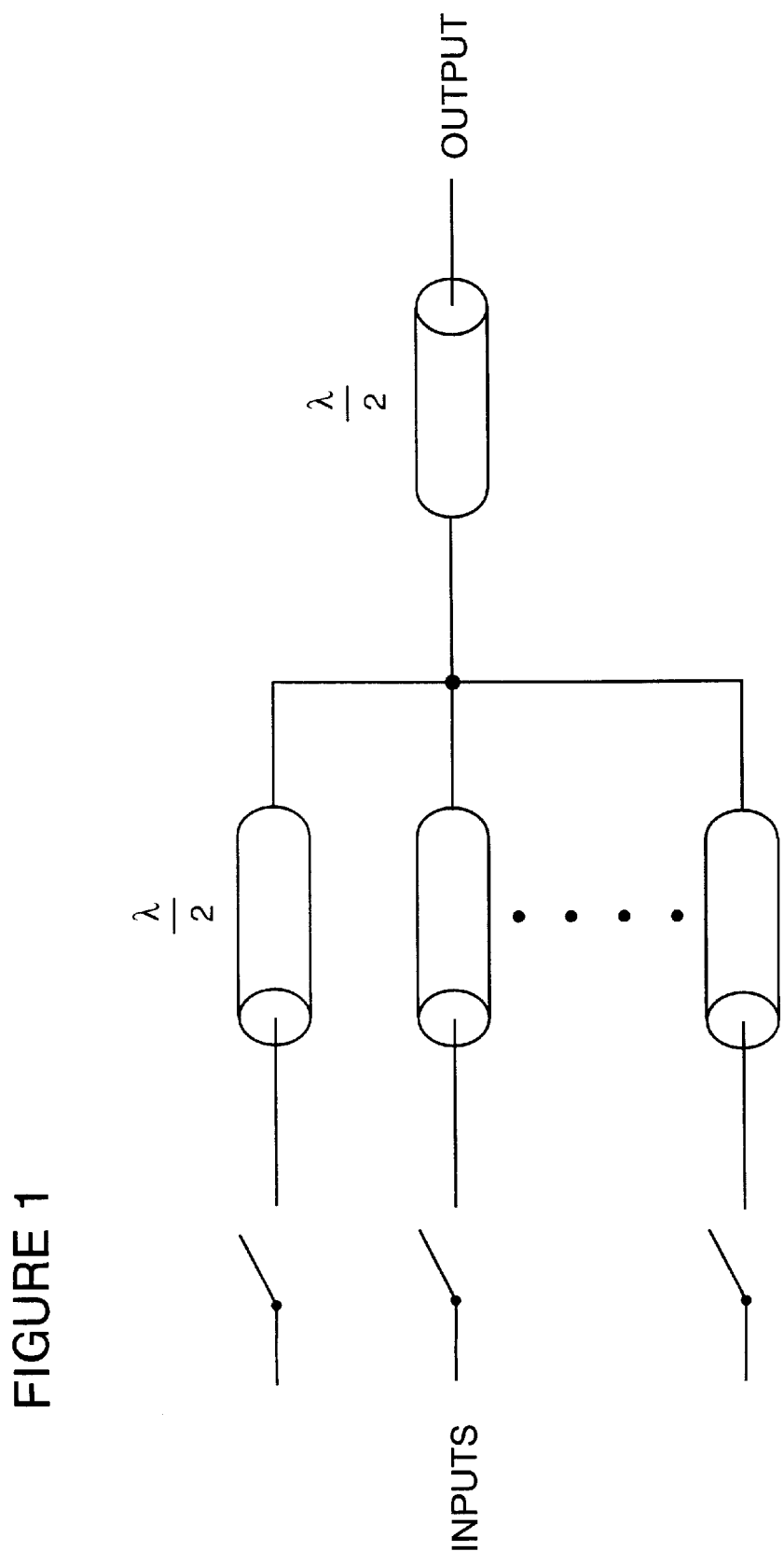
FIG. 1 is an example of a typical prior art combiner.
Figure 2:
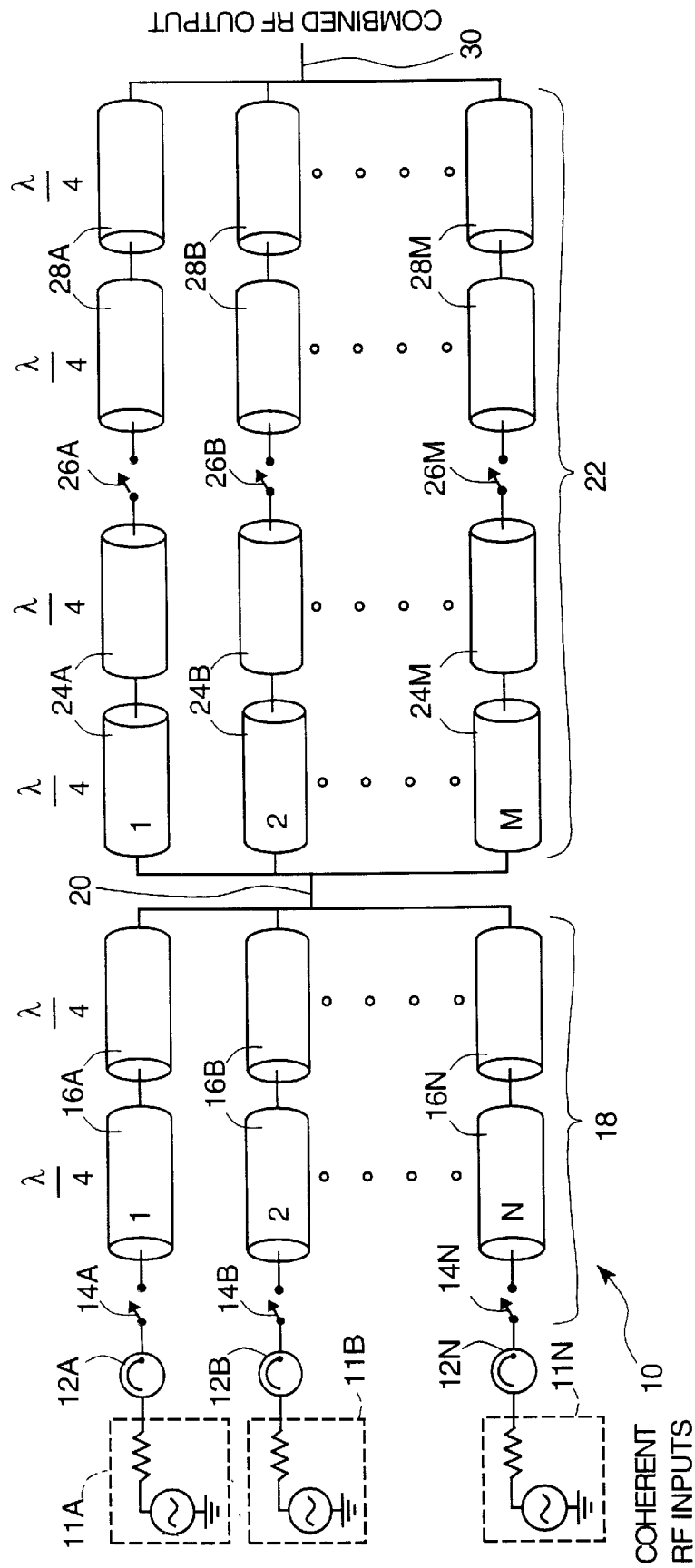
FIG. 2 is an illustration of a preferred embodiment of a combiner/splitter in accordance with the invention.

Referring to FIG. 2, a combiner 10 in accordance with the invention has a plurality of potential input sources, preferably coherent, in phase, sources 11A, 11B, . . . , 11N. Each source has a source impedance, $Z_0$. Each source is connected to an isolator 12A, 12B . . . 12N. Each isolator is connected through a single pole, single throw switch 14A, 14D, . . . , 14N, respectively, to a series connection of two quarter wave coaxial transmission lines 16A, 16B, . . . , 16N, respectively. Each series connected pair of quarter wavelength lines could be replaced by a half wavelength line if desired. The outputs of the quarter wavelength lines 16 are summed by being connected together to form a common output over a line 20 from the combining section 18. The common output over line 20 connects to a matching section 22, and, in particular, to a series of quarter wave transmission lines 24A, 24B, . . . , 24M which in turn are connected through switches 26A, 26B, . . . , 26M (single pole, single throw switches) to series connected quarter wavelength coaxial transmission lines 28A, 28B, . . . , 28M respectively. The output of the transmission lines 28 are summed by being connected together to form a combined RF output over a line 30.

In operation, the sources 11 are connected through switches, 14, to an initial half wavelength stage. If any source 11 is not present or is not to be connected, its corresponding switch 14 is opened, thus breaking the connection. Depending upon how many of the switches 14 are closed, the effective impedance presented at line 20 by section 18 will vary. Accordingly, it is desirable to modify the impedance presented by section 22 to match the impedance of section 18. Accordingly, any of switches 26 can be used to insert or remove a section of half wave length elements 24 and 28 so that section 22 will match section 20. Note also that the number of elements, M, in section 22 may be the same as or different than the number of elements N in section 18. As a result of closing one or more of switches 26, the insertion loss of the combiner 10 is minimized, and, ideally, is zero.

While the use of switches 14 to present a high-impedance at common line 20 when the switch is opened is old, the use of the switchable matching section 22 has not ever been accomplished. In particular, the series switches 26, when opened, effectively remove that section of the transmission line from the parallel connection of section 22 by presenting an open circuit at lines 20 and 30 respectively. By choosing which of the parallel sections to include, therefore, the combiner matches the output of section 18 to line 30.

The combiner 10, also, can operate in a reverse splitter mode by placing an input signal at line 30 and taking the output signal from switches 14. Thus the same circuitry, and structure, can be used in one direction as a combiner and in the opposite direction as a splitter.

Figure 3:
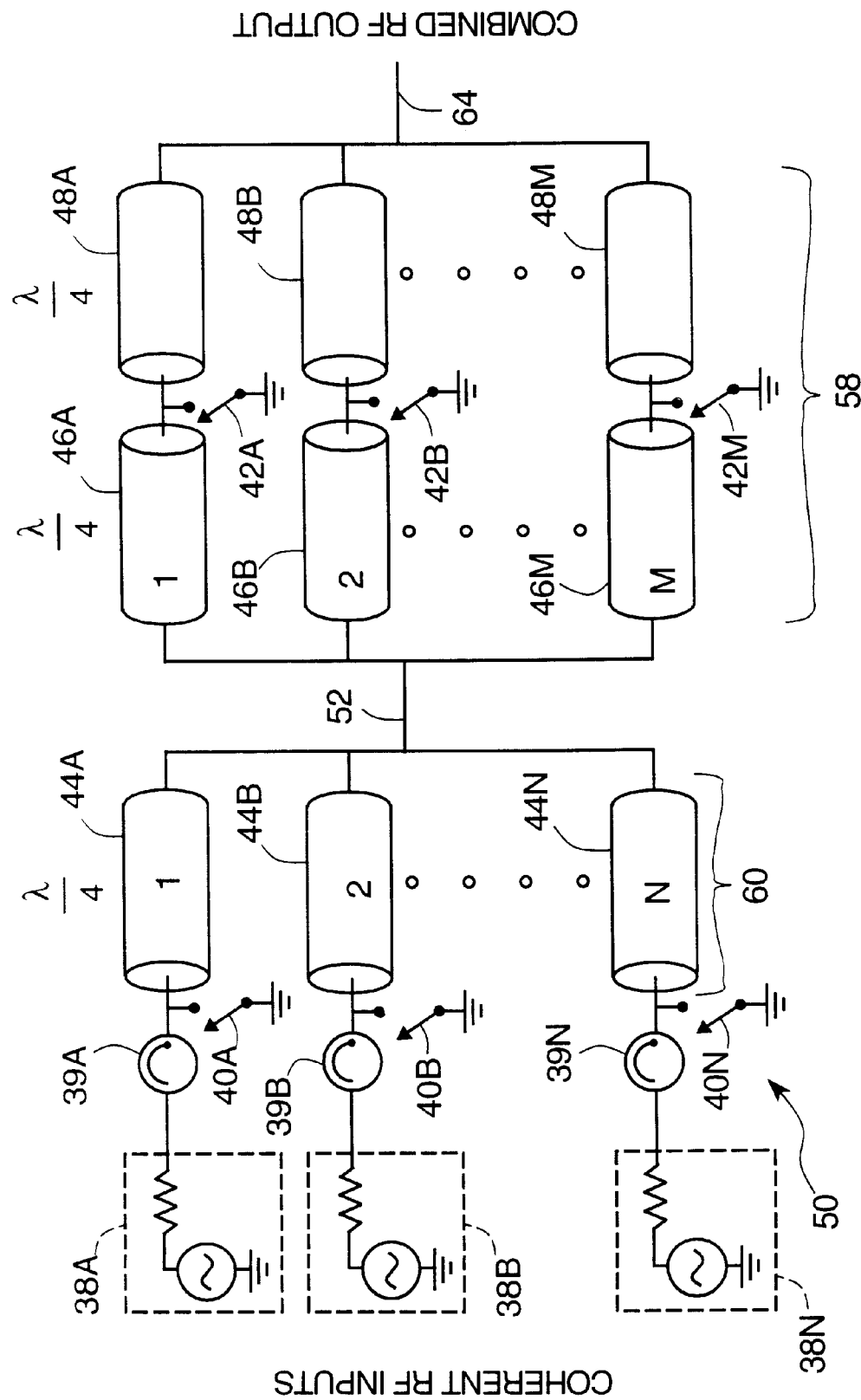
FIG. 3 is an illustration of an alternate embodiment of a combiner/splitter in accordance with the invention.

Referring to FIG. 3, in another aspect of the invention, parallel shorting switches 40A, 40B, . . . , 40N and 42A, 42B, . . . , 42M replace the series switches illustrated in FIG. 2. Correspondingly, the transmission line lengths are shortened to a quarter wavelength instead of the half wavelength series elements in FIG. 2. In operation, the circuits work substantially the same. Thus if no input signal from a source 38A, 38B, . . . , 38N, through isolators 39A, 39B, . . . , 39N, is available for the combiner 50 of FIG. 3, a switch 40 corresponding to that missing signal, is closed, grounding the input to the corresponding transmission line 44. This translates to an open circuit at common line 52. Similarly, one or more matching transmission lines 46, 48 are inserted or removed from the matching section 58. The combining section 60 operates as noted above in connection with combining section 18. The output of combiner 50, over a line 64 represents the sum of the input signals and the combiner 50 has, ideally, zero insertion loss provided the switch elements 42 are correctly set.

The combiner circuit 50, like the combiner circuit 10, also operates as a splitter when an input signal is applied over line 64 and the output signals are taken from the transmission lines 44 with the switches 40 in their open state. Also, switches 40 and 42, like their counterparts 14 and 26 in the embodiment of FIG. 2, are single pole, single throw switches, enabling the structure of FIG. 3 to be easily and simply implemented.

Referring now to FIG. 4, in accordance with the invention, a combiner structure 70 has input sources 71A, 71B, . . . , 71N, with source impedance $Z_0$, driving isolators, 72A, 72, . . . , 72N feeding quarter wavelength transmission lines 74A, 74B, . . . , 74N which are connected through single pole, single throw switches 76A, 76B, . . . , 76N to a common line 78. This is the combiner section 80 of the combiner 70. The matching section 82 has single quarter wavelength transmission lines 84A, 84B, . . . , 84M in each parallel path connected in circuit through single pole, single throw switches 86A, 86B, . . . , 86M and 88A, 88B, . . . , 88M to the common line 78 and the line 90 respectively. Thus, in this embodiment, one or more of sections 84 can be inserted into or removed from the matching section by opening both of the associated switches 86 and 88. Similarly, when there is no source or source signal 72 the corresponding switch 76 is opened to remove that section of transmission line from the combiner circuit. Matching is performed in this embodiment of the invention in the same manner as in the embodiments of FIGS. 2 and 3.

The circuitry and structure of combiner 70 can be employed as a splitter when the input signal is applied to line 90 and the output is taken from the quarter wavelength transmission lines 74. Thus, each of the embodiments of FIGS. 2, 3, and 4 can operate in one direction as a combiner and in the other direction as a splitter.

Additions, subtractions, and other modifications of the invention will be apparent to those of ordinary skill in this field and are within the scope of the following claims.

What is claimed is:

1. Apparatus for combining a plurality of high frequency RF signal inputs comprising a combining section for switchably combining selected ones of said RF signal inputs and having a common summed signal output, and a switchable matching section connected at its input to the common summed signal output and able to switchably insert matching lines between its input and a common output of the matching section, said switchable matching section being able, by a selected switch pattern, to substantially match the impedance presented to it by the common summed signal output, whereby RF inputs to the combining section can be switchably changed, and the matching section can be switchably changed to minimize insertion loss through the combining apparatus.

2. The apparatus of claim 1 for combining a plurality of high frequency RF signal inputs wherein the combining section comprises a plurality of switches each having an input terminal and an output terminal, each switch input terminal connected to a different one of said signal inputs, and a plurality of half-wave sections each having an input terminal and an output terminal, each section input terminal connected to a different one of said switch output terminals, and all of the section output terminals being connected together.

3. The apparatus of claim 2 wherein each half-wave section comprises a series connection of two quarter-wave sections.

4. The apparatus of claim 1 for combining a plurality of high frequency RF signal inputs wherein the combining section comprises a first plurality of switches, each having an input terminal and an output terminal, each switch output terminal being connected together, and a plurality of quarter-wave sections each having an input terminal and an output terminal, each section input terminal being connected to a different one of said RF signal inputs, and each said output terminal being connected to a different one of said switch input terminals.

5. The apparatus of claim 1 for combining a plurality of high frequency RF signal inputs wherein the combining section comprises a plurality of switches, each having an input terminal and an output terminal, each switch input terminal being connected to a different one of said signal inputs and each switch output terminal being connected to a ground terminal whereby said input signal is shunted to ground when said switch is in a closed position, and a plurality of quarter-wave sections, each having an input terminal and an output terminal, each section input terminal being connected to a different one of said RF signal inputs, and all of the section output terminals being connected together to generate said common summed signal output.

6. The apparatus of claim 1 for combining a plurality of high frequency RF signal inputs wherein the matching section comprises a first plurality of half-wave transmission line sections, each having a input terminal and an output terminal, all of said input terminals being connected together to said common summed signal output, a plurality of switches, each switch having an input terminal and an output terminal, each switch input terminal being connected to a different output terminal of said first half-wave sections, and a second plurality of half-wave sections, each having an input terminal and an output terminal, all of said output terminals being connected together to provide said combined common output and each input terminal being connected to a different switch output terminal.

7. The apparatus of claim 6 wherein each half-wave section can be comprised of two quarter-wave sections connected in series.

8. The apparatus of claim 1 for combining a plurality of high frequency RF signal inputs wherein the matching section comprises a first plurality of quarter-wave sections, each section having an input terminal and an output terminal, each section input terminal being connected together to said common summed signal output, a plurality of switches, each, having an input terminal and an output terminal, each switch input terminal being connected to a different one of said quarter-wave section output terminals and each switch output terminal being connected to ground to shunt the quarter-wave section output, and a second plurality of quarter-wave sections each having an input terminal and an output terminal, each second section input terminal being connected to a different one of said switch input terminals and all of the second section output terminals being connected together to form said matching section output.

9. The apparatus of claim 1 for combining a plurality of high frequency RF signal inputs wherein the matching section comprises a first plurality of switches, each switch having an input terminal and an output terminal, each switch input terminal being connected together to the common summed signal output, a plurality of quarter-wave sections each having an input terminal and an output terminal, each section input terminal being connected to a different one of said switch output terminals, and a second plurality of switches each having an input terminal and an output terminal, each second switch input terminal being connected to a different one of said quarter-wave section output terminals and each output terminal of said second switches being connected together to form the common output of the matching section.

10. A method for combining a plurality of high frequency RF signal inputs comprising the steps of switchably combining selected ones of said RF signal inputs and providing a common summed signal output, switchably inserting matching lines between the common summed signal output and a combined output for matching the impedance presented by the switchably combined signal inputs, and switchably inserting said matching lines in correspondence to the switchably combining of said RF signal inputs to provide a minimized insertion loss from said RF signal inputs to a combined output.

11. Apparatus for splitting a high frequency RF signal input into a plurality of RF signal outputs comprising a splitting section for switchably splitting an RF signal input from the output of a matching section, a switchable matching section connected at its input to the high frequency RF signal input and able to switchably insert matching lines between its input and its output, said switchable matching section being able, by a selected switch pattern, to substantially match the impedance presented to it by the splitting section, whereby the number of RF outputs from the splitting section can be switchably changed, and the matching section can be switchably changed to minimize insertion loss through the splitting apparatus.

12. The apparatus of claim 11 for splitting a high frequency RF signal input wherein the splitting section comprises a plurality of switches each having an input terminal and an output terminal, each switch input terminal connected to a different one of said signal outputs, and a plurality of half-wave sections each having an input terminal and an output terminal, each section output terminal connected to a different one of said switch output terminals, and all of the section input terminals being connected together.

13. The apparatus of claim 12 wherein each half-wave section comprises a series connection of two quarter-wave sections.

14. The apparatus of claim 11 for splitting a high frequency RF signal input wherein the splitting section comprises a first plurality of switches, each having an input terminal and an output terminal, each switch input terminal being connected together, and a plurality of quarter-wave sections each having an input terminal and an output terminal, each section output terminal being connected to a different one of said RF signal outputs, and each said input terminal being connected to a different one of said switch output terminals.

15. The apparatus of claim 11 for splitting a high frequency RF signal input wherein the splitting section comprises a plurality of switches, each having an input terminal and an output terminal, each switch output terminal being connected to a different one of said signal outputs and each switch input terminal being connected to a ground terminal whereby said output signal terminal is shunted to ground when said switch is in a closed position, and a plurality of quarter-wave sections, each having an input terminal and an output terminal, each section output terminal being connected to a different one of said RF signal outputs, and all of the section input terminals being connected together to form said RF signal input to the splitting section.

16. The apparatus of claim 11 for splitting a high frequency RF signal input wherein the matching section comprises a first plurality of half-wave transmission line sections, each having a input terminal and an output terminal, all of said output terminals being connected together to generate said RF summed signal output to the splitting section, a plurality of switches, each switch having an output terminal and an output terminal, each switch output terminal being connected to a different input terminal of said first half-wave sections, a second plurality of half-wave sections, each having an input terminal and an output terminal, all of said input terminals being connected together to receive said RF input signal and each output terminal being connected to a different switch input terminal.

17. The apparatus of claim 16 wherein each half-wave section can be comprised of two quarter-wave sections connected in series.

18. The apparatus of claim 11 for splitting a high frequency RF signal input wherein the matching section comprises a first plurality of quarter-wave sections each section having an input terminal and an output terminal, each section output terminal being connected together to form said RF signal output to the splitter section, a plurality of switches, each, having an input terminal and an output terminal, each switch output terminal being connected to a different one of said quarter-wave section output terminals and each switch input terminal being connected to ground to shunt the connected quarter-wave section, and a second plurality of quarter-wave sections each having an input terminal and an output terminal, each second section output terminal being connected to a different one of said switch input terminals and all of the second section input terminals being connected together to receive said RF signal input.

19. The apparatus of claim 11 for splitting a high frequency RF signal input wherein the matching section comprises a first plurality of switches, each switch having an input terminal and an output terminal, each switch output terminal being connected together and to the common signal output to the splitter section, a plurality of quarter-wave sections each having an input terminal and an output terminal, each section output terminal being connected to a different one of said switch input terminals, and a second plurality of switches each having an input terminal and an output terminal, each second switch output terminal being connected to a different one of said quarter-wave section input terminals and each input terminal of said second switches being connected together to receive said RF signal input.

20. A method for splitting a high frequency RF signal input comprising the steps of switchably inserting matching lines between a common summed signal output and a combined input connected to the RF signal input for matching the impedance presented by a splitting section, splitting selected ones of said RF signal inputs from the common summed signal output, and switchably inserting said matching lines in correspondence to switchable splitting of said RF signal input to provide a minimized insertion loss from said RF signal input to the split outputs.

* * * * *

UNITED STATES PATENT AND TRADEMARK OFFICE
CERTIFICATE OF CORRECTION

PATENT NO. : 6,252,871 B1
DATED : June 26, 2001
INVENTOR(S) : Richard D. Posner and Thuan Tran It is certified that error appears in the above-identified patent and that said Letters Patent is hereby corrected as shown below:

<u>Column 7,</u>
Line 24, replace "output" with -- input --.

Signed and Sealed this

Seventh Day of May, 2002

Attest:

Attesting Officer

JAMES E. ROGAN
*Director of the United States Patent and Trademark Office*